July 4, 1950          H. H. HOPKINS          2,514,239
VARIABLE MAGNIFICATION OPTICAL SYSTEM Filed Oct. 22, 1948          2 Sheets-Sheet 1

Inventor
HAROLD H. HOPKINS

By Watson, Cole, Grindle & Watson
Attorneys

July 4, 1950     H. H. HOPKINS     2,514,239
VARIABLE MAGNIFICATION OPTICAL SYSTEM
Filed Oct. 22, 1948     2 Sheets-Sheet 2

INVENTOR
Harold H. Hopkins
By Watson, Cole, Grindle & Watson

Patented July 4, 1950

2,514,239

UNITED STATES PATENT OFFICE 2,514,239

VARIABLE MAGNIFICATION OPTICAL SYSTEM

Harold Horace Hopkins, London, England, assignor to W. Watson & Sons Limited, London, England, a British company Application October 22, 1948, Serial No. 55,967
In Great Britain July 2, 1948

4 Claims. (Cl. 88—57)

This invention relates to variable magnification optical systems of the kind (hereinafter referred to as the kind described) which may be used alone or in conjunction with a further optical system (e. g. the lens system of a camera) to produce an image of continuously variable size of an object at a fixed distance from the system. Such systems may be used for example with a stationary cine camera or television transmitting camera in order continuously to increase or decrease the size of the image, on the film or other image receiving device, of objects in the scene towards which the camera is directed and thereby to give the impression when the film is projected, or the television receiver is viewed, that the view-point approaches or recedes from objects in the scene.

A known variable magnification optical system of the kind described comprises two fixed negative (divergent) lenses and an axially movable refracting positive (convergent) lens arranged on a common optical axis, the movable lens being between and spaced from the two fixed lenses.

It is an object of the present invention to provide an improved optical system of the kind described having reduced dimensions both in length and diameter for the same size of exit pupil and the same range of variation of magnification.

The invention consists, in one of its forms, in a variable magnification optical system of the kind described comprising two fixed positive (convergent) lenses and an axially movable negative (divergent) lens arranged on a common axis, the movable lens being between and spaced from the two fixed lenses.

In co-pending application No. 55,964, now Patent No. 2,501,219, dated March 21, 1950, there is disclosed an optical system of the kind described comprising two fixed negative (divergent) lenses and two axially movable positive (convergent) lenses arranged on a common optical axis, the movable lenses being between and spaced from the two fixed lenses. The invention, in another of its forms, consists of the improvement in the optical system just described which comprises employing positive (convergent) lenses for the fixed outer lenses and negative (divergent) lenses for the axially movable members. The system preferably includes adjusting means for continuously and simultaneously differentially moving the negative lenses in the axial direction of the system by amounts such that the distance, from the fixed lenses, at which the image of an object at a fixed distance from the fixed lenses is accurately focussed remains constant while the size of the said image is continuously varied during the operation of the adjusting means. The adjusting means may be as described in specifications No. 55,964 and 55,966 with modifications to suit the changes in the optical members employed in the present invention.

It is within the present invention to provide means for the initial adjustment of one or more of the lenses as described in specification No. 55,965.

The lenses are not necessarily simple lenses and one or more of the lenses may be composed of two or more simple lenses cemented together or spaced apart.

It is preferred that the movable lenses employed in the system according to the invention each have one substantially plane outer surface.

The system may be constructed in the form of an attachment arranged to fit in front of a camera or other optical device.

A specific embodiment of the invention will now be described by way of example and with reference to the accompanying drawings in which.

Figure 1:
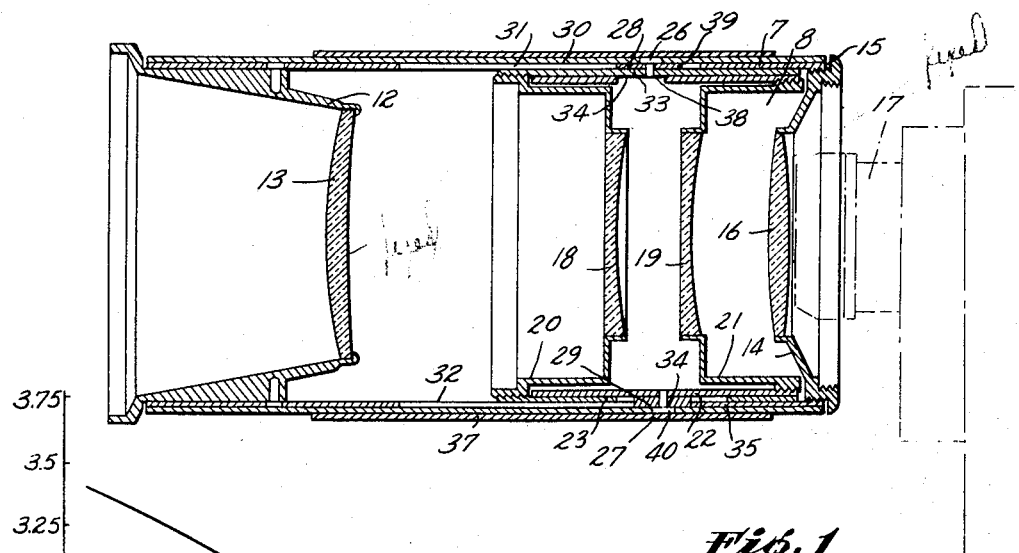
Figure 1 is a sectional view of an attachment embodying the invention and fitted to a cine camera, the front part of the camera only being indicated (in chain lines)
Figure 2:
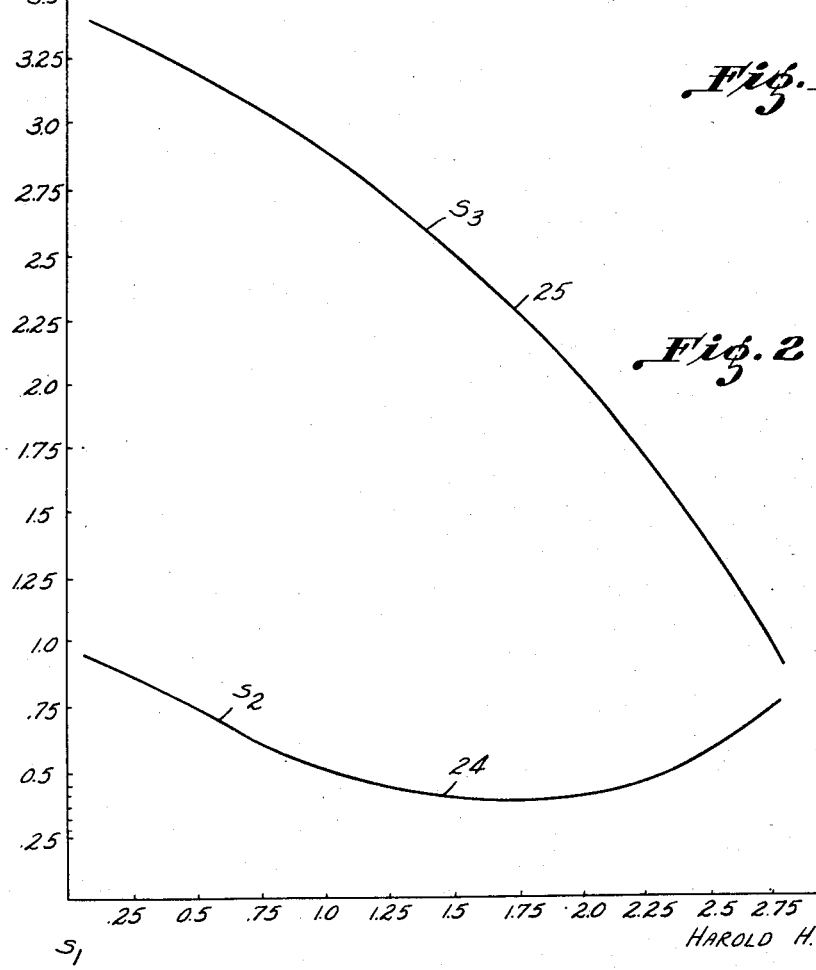
Figure 2 is a graph indicating the nature of the axial movements imparted to the movable lenses in the attachment.
Figure 4:
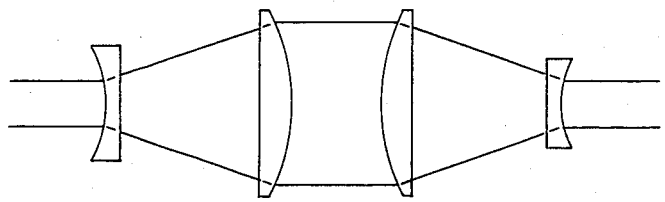
Figure 3:
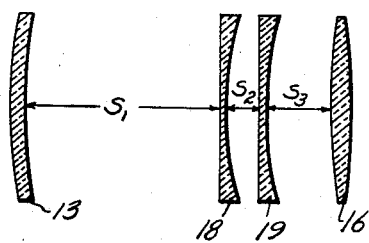

Figure 3 indicates the distances to which the curves of Figure 2 refer;

Figure 4 illustrates diagrammatically the arrangement previously proposed; and

Figure 5:
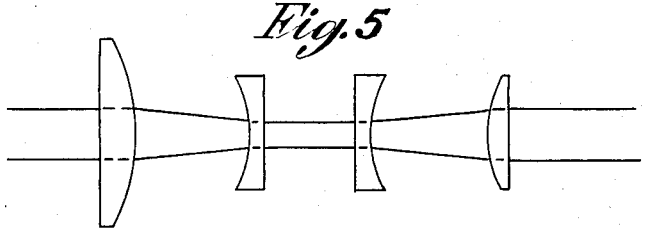

Figure 5 illustrates diagrammatically the arrangement according to the present invention.

This embodiment employs adjusting means, for the lenses, as described in specifications Nos. 55,964 and 55,966 of even date.

The attachment 8 comprises a body tube 7 to the front end of which is attached, by means described in co-pending application No. 55,965 of even date, a cell 12 carrying a positive lens which in this example is a converging lens 13 and which constitute the front fixed positive lens of the system. The body tube 7 carries at its rear end a cell 14 attached to it by a screw thread 15 and carrying a bi-convex lens 16 which is the rear fixed positive lens of the system. The rear lens cell 14 projects inwardly into the attachment and its outer surface surrounds the objective lens carrier 17 of the cine camera and prevents light, other than that which passes through the attachment, from entering the camera.

Two plano-concave lenses 18 and 19 are carried in cells 20 and 21, mounted respectively in a tube 23 and a tube 22, and form the two movable negative lenses of the system. The tube 22, carrying the rear negative lens 19, slides within the tube 23, carrying the front negative lens 18, and the tube 23 slides within the body tube 7.

The bodily and relative movements which it is necessary to impart to the movable lenses in order to enable the image size to be continuously varied without defocussing may be computed employing the usual methods of calculation from the optical constants of the lenses, the separation of the fixed lenses and like factors. An example of the required movements for a particular combination of lenses is shown in Figure 2 in which the curves 24 and 25 indicate respectively the required relative movements of the two lenses 18 and 19 and the required movement of the lens 19 with respect to the lens 16, as functions of the movement of the lens 18 with respect to the lens 13. The distances $S_1$ $S_2$ and $S_3$ to which the curves of Figure 2 relate are shown in Figure 3.

The necessary movements are in this example imparted to the lenses 18, 19 by means as described in co-pending application No. 55 966 of even date. This means comprises two pins 26 and 27 extending respectively radially outwards from the tubes 23 and 22 and carrying feathers 39 and 40 which engage the sides of curved cam slots 28 and 29 in an outer tube 30 which is carried on the body tube 7 and is partially rotatable thereon about its axis. The lens carrying tubes 22 and 23 are prevented from rotating and are constrained for axial movement by means of two straight longitudinally extending slots 31 and 32 which are formed in the body tube 7, the sides of which slots engage feathers 33 and 34 carried on the pins 26 and 27 which pass respectively through the two longitudinally extending slots 31 and 32.

The pin 27 also passes through, and the feather 34 lies partly within, a longitudinally extending clearance slot 35 which is formed in the outer movable lens carrying tube 23 and is sufficiently large not to restrict the movements of the pin 27 and the feather 34. A longitudinally extending clearance slot 38 is also provided in the inner movable lens carrying tube 22 to receive a projection, through the inner surface of the tube 23, of the pin 26 without restricting the movement of the pin 26.

The cam slots 28 and 29 in the rotatable tube 30 are so shaped that as the tube 30 is rotated, the feathers 39, 40 and pins 26, 27 travel along the slots 28 and 29 and move the lens carrying tubes 22 and 23, to which they are attached, axially in the manner required. The necessary shapes of the slots 28 and 29 may be calculated from computed curves of the kind shown in Figure 2. The rotatable tube 30 is enclosed within a cover tube 37 which is attached to it and protects the slots 28 and 29 and retains the feathers 39, 40.

Figures 4 and 5 respectively of the accompanying drawings illustrate diagrammatically the arrangement previously proposed and the arrangement according to the present invention and show that the employment of the particular arrangement of lenses provided by the present invention has the following advantages in relation to the previously proposed arrangement in which the fixed lenses were negative and the movable members positive. The distribution of power between the different lenses is such that the incidence heights of the principal rays of oblique pencils at the inner lenses of the system are reduced, thereby permitting of smaller diameters for the various lenses. Because of this and of the reduction in the relative aperture of each lens it is possible within a comparable length to attain satisfactory definition with an exit pupil up to twice that of the previous arrangement and consequently for given size of pupil the linear dimensions of the system can be reduced. The overall dimensions of the new system may consequently be substantially less than those of the previous system for the same results.

I claim:

1. A variable magnification optical system comprising two fixed positive lenses and two movable negative lenses arranged on a common optical axis, with the movable lenses between and spaced from the two fixed lenses, and mechanical adjusting means operable to effect simultaneously movements of the two movable lenses, relative to the fixed lenses and relative to each other, in the axial direction and according to a law such that the distance, from the fixed lenses, at which the image of an object at a fixed distance from the fixed lenses is accurately focussed by the system remains constant while the size of the said image is continuously varied during the operation of the adjusting means.

2. A variable magnification optical system comprising two coaxial axially movable tubes, two negative lenses carried by the two tubes respectively and on a common optical axis, a fixed supporting tube outside and concentric with the two movable tubes, two positive lenses carried by the supporting tube on the aforesaid optical axis outside the negative lenses, and mechanical adjusting means operable to effect simultaneously movements of the two movable tubes, relative to the supporting tube and relative to each other, in the axial direction and according to a law such that the distance, from the fixed lenses, at which the image of an object at a fixed distance from the fixed lenses is accurately focussed by the system remains constant while the size of the said image is continuously varied during the operation of the adjusting means.

3. A variable magnification optical system comprising two coaxial axially movable tubes, two negative lenses carried by the two tubes respectively and on a common optical axis, a fixed supporting tube outside and concentric with the two movable tubes, two positive lenses carried by the supporting tube on the aforesaid optical axis outside the negative lenses, projections from the two movable tubes respectively each extending outwards from the tubes into cooperative guiding engagement with at least one guide slot in the support tube, the guide slot extending in the axial direction of the assembly and the engagement of the projections within the slot limiting circumferential movement of the projections, and cam means rotatable as a unit about the axis of the assembly and engageable with the projections to effect, on rotation of the cam means, differential movements of the two projections and the tubes connected thereto in the axial direction, and according to a law such that the distance, from the fixed lenses, at which the image of an object at a fixed distance from the fixed lenses is accurately focussed remains constant while the size of the said image is continuously varied during the operation of the adjusting means.

4. An optical system comprising two concentric relatively axially movable nested tubes, two negative lenses carried by the two tubes at opposite ends thereof respectively and on a common optical axis, a fixed supporting tube outside and concentric with the two movable tubes, two positive lenses carried by the supporting tube on the foresaid optical axis outside the negative optical lenses, a projection from one of the movable tubes extending in the radial direction through an axially extending slot in the wall of the other movable tube into cooperative guiding engagement with a guide slot in the support tube, a projection from the other movable tube at a position diametrically opposed to the first projection and extending in the radial direction into cooperative guiding engagement with a second guide slot in the support tube, the guide slots extending in the axial direction of the assembly and the engagement of the projections with the slots limiting circumferential movement of the projections, and cam means rotatable as a unit about the axis of the assembly and engageable with the two projections to effect, on rotation of the cam means, differential movements of the two projections and the tubes connected thereto in the axial direction, and according to a law such that the distance, from the fixed lenses, at which the image of an object at a fixed distance from the fixed lenses is accurately focussed remains constant while the size of the said igame is continuously varied during the operation of the adjusting means.

HAROLD HORACE HOPKINS.

REFERENCES CITED

The following references are of record in the file of this patent:

UNITED STATES PATENTS

| Number | Name | Date |
|---|---|---|
| 696,788 | Allen | Apr. 1, 1902 |
| 1,709,232 | Flora | Jan. 27, 1931 |
| 2,165,341 | Capstaff et al. | July 11, 1939 |
| 2,405,729 | Altman | Aug. 13, 1946 |

FOREIGN PATENTS

| Number | Country | Date |
|---|---|---|
| 21,211 | Great Britain | of 1901 |
| 3,799 | Great Britain | of 1912 |